United States Patent [19]

Froment

[11] Patent Number: 4,546,800

[45] Date of Patent: Oct. 15, 1985

[54] DRAW LEVER ASSEMBLIES MOUNTED ON THE DOBBIES AND OTHER MECHANISM FOR FORMING THE SHED ON WEAVING MACHINES

[75] Inventor: Jean P. Froment, Faverges, France

[73] Assignee: S. A. des Etablissements STAUBLI (France), Faverges, France

[21] Appl. No.: 650,734

[22] Filed: Sep. 14, 1984

[30] Foreign Application Priority Data

Sep. 21, 1983 [FR] France .................. 83 15198

[51] Int. Cl.$^4$ .............................................. D03C 1/00
[52] U.S. Cl. ................................... 139/66 A; 139/74; 139/82
[58] Field of Search ............. 139/72, 74, 66 R, 76, 139/82, 66 A; 384/615, 613, 245; 308/243

[56] References Cited

U.S. PATENT DOCUMENTS

| 1,137,263 | 4/1915 | Gohlke | 384/613 |
| 1,766,744 | 6/1930 | Gordon | 139/66 R |
| 2,102,952 | 12/1937 | Hellyar | 384/606 |
| 2,726,907 | 12/1955 | Krauss | 384/615 |
| 3,167,363 | 1/1965 | Murphy | 384/315 |

FOREIGN PATENT DOCUMENTS 2256975 8/1975 France .

Primary Examiner—Henry S. Jaudon
Assistant Examiner—Steve Shongut
Attorney, Agent, or Firm—Dowell & Dowell

[57] ABSTRACT

The present invention relates to draw lever assemblies mounted on the dobbies and other mechanisms for forming the shed on weaving machines. Between the levers born by the fixed pin there are interposed axial stops, each of which includes two discs profiled to form between them a raceway for balls. The assembly is subjected to a constant axial pressure, furnished for example by an elastically deformable washer.

4 Claims, 2 Drawing Figures

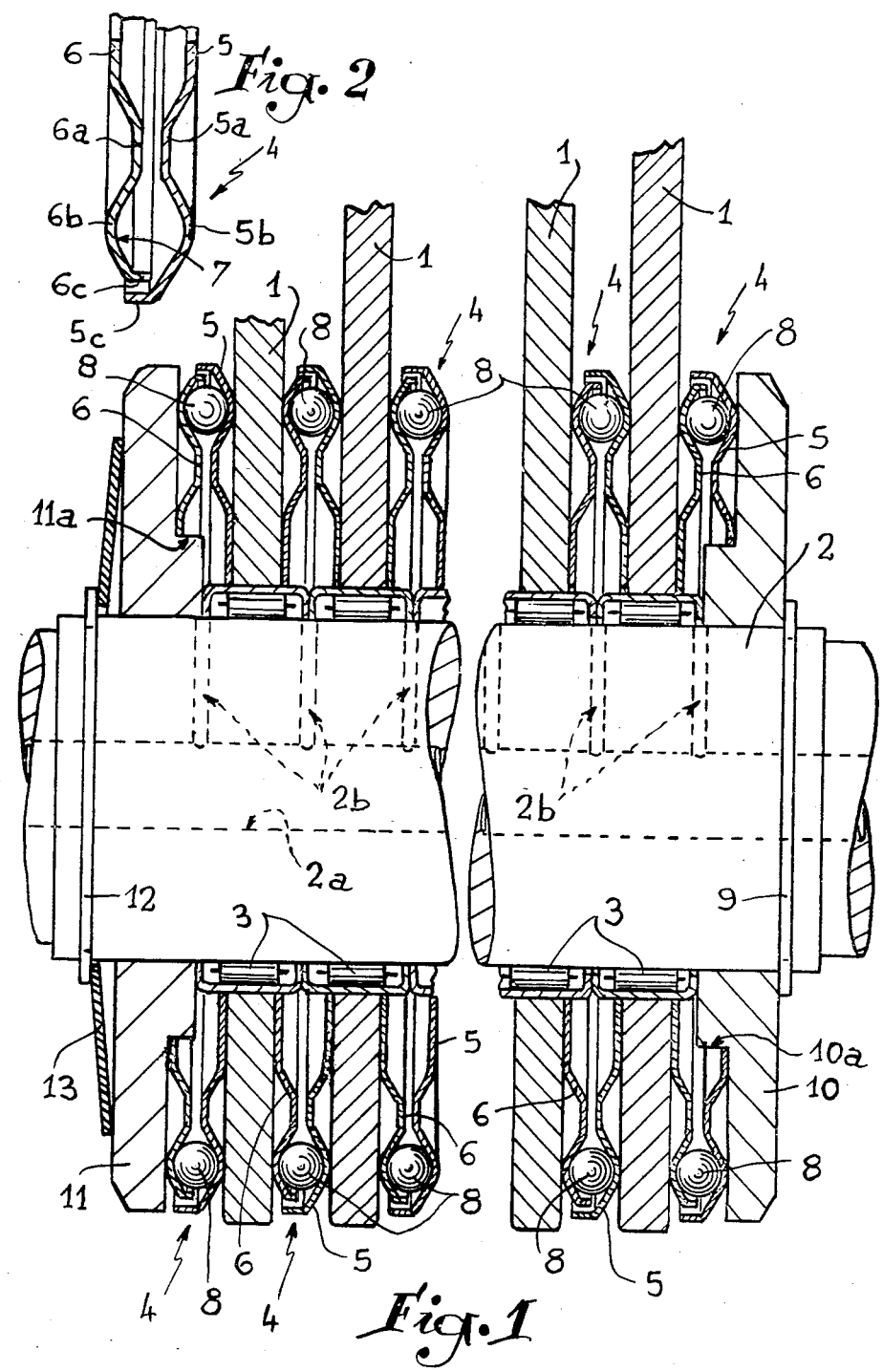

DRAW LEVER ASSEMBLIES MOUNTED ON THE DOBBIES AND OTHER MECHANISM FOR FORMING THE SHED ON WEAVING MACHINES

The present invention relates to dobbies and other mechanisms used for forming the shed on weaving machines, and more particularly to the drawing lever assemblies interposed between the members actuating the mechanism and the heddle frames of the corresponding machine.

As is known, each mechanism usually incorporates a first assembly of oscillating levers, the latter being directly coupled to the actuating members for the purpose of transmitting the vertical rising and lowering movement to the heddle frames associated with said mechanisms. Furthermore, one or more assemblies of oscillating levers are provided in the drawing system incorporating cables or connecting rods, which achieve the transmission of the movements referred to above.

In practice, each of these assemblies usually comprises a fixed pin which supports a series of levers mounted side by side, either directly, or with the interposition of bearings. These levers are located axially by mutual friction contact at their lateral faces, suitably machined to this end. It will be readily appreciated that such an arrangement necessitates very frequent applications of grease, any lack of lubrication causing seizure of the parts. Despite such greasing, the lateral faces of the levers wear out relatively quickly. It will further be noted that, when the fixed pin or pivot is oriented obliquely with respect to the horizontal (and this case is not rare in practice), the forces of friction in the axial direction become considerable and limit the operational speed of the weaving machines.

It is a principal object of the present invention to overcome these drawbacks and it is essentially achieved by interposing between the different levers of the assembly an axial stop formed by two thin discs profiled so as to form a raceway for a row of balls, and by applying a virtually constant force of axial pressure exerted on the stack thus formed.

The invention will be more readily understood on reading the following description with reference to the accompanying drawings, in which:

FIG. 1 is a partial axial section of an assembly of draw levers according to the invention.

FIG. 2 is a section in detail illustrating the shape of the discs which form one of the axial stops of the assembly according to FIG. 1.

Referring now to the drawings, reference 1 in FIG. 1 designates the oscillating draw levers engaged on a fixed pin 2 with the interposition of needle roller bearings 3. Between two adjacent levers 1 there is interposed an axial stop 4 formed by two discs 5 and 6 of which the central opening, itself engaged on pin 2, abuts on the projecting parts of said bearings 3.

Each disc 5 or 6 is constituted by a very thin plate which has been stamped to comprise an annular depression 5a, 6a respectively (FIG. 2), the latter determining, in the vicinity of the periphery, a dish 5b, 6b, itself of annular form, the free edge of each disc being bent axially in order to form a nose element 5c, 6c; the disc 5 of each stop 4 has a diameter slightly larger than that of disc 6, so that the two annular nose elements 5c and 6c overlap each other when the two discs are coupled with the dishes 5b and 6b open opposite each other.

Under these circumstances, it will be readily understood that these two dishes define an annular space referenced 7 in FIG. 2, which forms a housing or raceway for a row of balls 8 (FIG. 1) which maintain the two discs 5 and 6 of each stop 4 at an appropriate axial distance. Each stop 4 acts as a spacer with respect to the two levers 1 between which it is interposed.

Near one of its ends, the fixed pin 2 bears an elastic ring 9 forming a stop for a side member 10; the latter carries an annular shoulder 10a constituting support for the disc 5 of a first stop 4, interposed between said side member 10 and the first draw lever 1 of the assembly in question. In the same way, the disc 6 of the last axial stop 4 of this assembly abuts on the annular shoulder 11a of a second side member 11 and it will be observed that, between this side member 11 and the elastic ring 12 fixed on the pin 2 to axially retain it, there is interposed an elastically deformable washer 13 shaped so as to act as spring, in the manner of Belleville type washers.

It will be readily appreciated that this washer 13 maintains the stack which constitutes the assembly according to the invention under a virtually constant axial force. This axial force ensures the correct geometry of the discs 5 and 6 which form the different stops 4, so that the latter are capable of effecting perfect guiding of the levers 1.

Tests have shown that such a guiding system avoided any wear attributable to friction. No effect of seizure appeared, even in the case of the fixed pin 2 being oriented obliquely with respect to the horizontal, this consequently enabling very high operational speeds to be obtained.

Lubrification may be carried out less frequently than in conventional systems. According to a particularly advantageous embodiment of the invention, the pin 2 may be provided with an axial bore 2a into which open out radial holes 2b disposed so as to open between the different bearings 3 and between the latter and the side members 10 and 11. It suffices to inject a lubricant periodically into the bore 2a to grease the bearings 3 and the balls 8 of the axial stops 4 simultaneously.

It must, moreover, be understood that the foregoing description has been given only by way of example and that it in no way limits the domain of the invention which would not be exceeded by replacing the details of execution described by any other equivalents. In particular, the deformable washer 13 may be replaced by a thrust ring, screwed or otherwise fixed on one of the ends of the pin 1, in order to exert a constant axial pressure on the stops 4.

What is claimed is:

1. In a weaving machine of the type having multiple oscillating draw levers for controlling the shed of the machine and the oscillating levers being supported side by side for oscillation about a pin which is fitted with respect to the machine, improved lever bearing and guiding assembly means for supporting and positioning the oscillating levers on the pin, comprising:

through each lever an opening through which the pin passes, and bearing means between the lever and the pin operative to support the lever on the pin;

said lever bearing and guiding assembly means further comprising on each side of each lever a lever stop means comprising two paired and mutually opposed discs having central openings through which the pin passes and the discs being supported on said bearing means adjacent to and abutting said levers, the discs of each pair being profiled to form between them an annular raceway carrying balls which roll in the raceway as the discs rotate relative to eachother; and disc supporting members surrounding the pin and abutting the outer discs at the ends of the bearing and guiding assembly means and being operative to maintain axial pressure thereon.

2. The improved lever bearing and guiding assembly means as claimed in claim 1, wherein said disc supporting members include a deformable washer surrounding the pin and operative to apply axial pressure against one of said outer discs.

3. The improved lever bearing and guiding assembly means as claimed in claim 1, wherein said disc supporting members each includes a shoulder shaped to receive and support the central opening of the outer disc which it abuts.

4. The improved lever bearing and guiding assembly means as claimed in claim 1, wherein said fixed pin has an axial bore extending thereinto and underlying the bearing means and discs, and has radial holes extending from the bore to the bearing means and discs, whereby lubricant injected into the bore will reach the bearing means and discs through said radial holes.

* * * * *